United States Patent [19]

Throckmorton et al.

[11] 4,435,553

[45] Mar. 6, 1984

[54] PROCESS FOR NONAQUEOUS DISPERSION POLYMERIZATION OF BUTADIENE IN THE PRESENCE OF CARBONYLATED POLYMERIC DISPERSING AGENTS

[75] Inventors: Morford C. Throckmorton; Joginder Lal, both of Akron, Ohio

[73] Assignee: The Goodyear Tire & Rubber Company, Akron, Ohio

[21] Appl. No.: 420,066

[22] Filed: Sep. 20, 1982

[51] Int. Cl.$^3$ .............................................. C08F 2/08
[52] U.S. Cl. ..................................... 526/201; 526/203
[58] Field of Search ............... 526/201, 202, 203, 208, 526/340.4

[56] References Cited

U.S. PATENT DOCUMENTS 4,098,980 7/1978 Markle ............................... 526/201

*Primary Examiner*—Paul R. Michl
*Attorney, Agent, or Firm*—Alvin T. Rockhill

[57] ABSTRACT

This invention discloses a process for the nonaqueous dispersion polymerization of butadiene monomer in a reaction mixture containing a liquid nonaqueous dispersion medium, the improvement which comprises carrying out the polymerization of the butadiene monomer in the presence of at least one carbonylated polymer.

10 Claims, No Drawings

PROCESS FOR NONAQUEOUS DISPERSION POLYMERIZATION OF BUTADIENE IN THE PRESENCE OF CARBONYLATED POLYMERIC DISPERSING AGENTS

BACKGROUND OF THE INVENTION

A variety of polymerization processes are used in the formation of synthetic polymers. For example, the polymerization of a monomer can be conducted by bulk polymerization, suspension polymerization, emulsion polymerization or solution polymerization. Each of these systems has certain advantages and disadvantages.

Bulk polymerization is the direct conversion of liquid monomer to polymer in a reaction system in which the polymer generally remains soluble in its own monomer. Such bulk polymerizations are generally carried out by the addition of an initiator to a simple homogeneous system containing one or more monomers. The synthesis of polystyrene by the addition of a free radical initiator to styrene monomer is a good example of a very common bulk polymerization. The principal advantage of a bulk polymerization process is that the product obtained can be used directly since it is essentially free of solvents and impurities. One disadvantage of bulk polymerization reactions is that it is difficult to control the reaction temperature during polymerization.

In suspension polymerization, the initiator is dissolved in the monomer, the monomer is dispersed in water, and a dispersing agent is added to stabilize the suspension formed. All suspension polymerization processes use some type of surfactant and/or dispersing agent to keep the monomer globules dispersed through the reaction mixture in order to avoid coalescence and agglomeration of the polymer. Not only does the suspension stabilizer affect the particle size, but also the clarity, transparency and film-forming properties of the resultant polymer. A variety of dispersing agents including water-insoluble, finely divided, inorganic materials and organic materials, depending upon the monomer to be polymerized, have been used as dispersing agents. Thus, for example, talc, barium, calcium and magnesium carbonates, silicates, phosphates and sulfates, as well as poly(vinyl alcohol) tragacanth gum, salts of styrene-maleic anhydride copolymers, vinyl acetate-maleic anhydride copolymers and their salts, starch, gelatin, pectin, alginates, methyl cellulose, carboxymethyl cellulose, bentonite, limestone and alumina have been used as suspending agents. A major advantage of suspension polymerization is that the polymeric products are obtained in the form of small beads which are easily filtered, washed and dried. For reasons of cost and unreactivity, water is often a much more desirable diluent and heat-transfer medium than most organic solvents.

However, in certain polymerization processes, for example, in the preparation of very high cis-1,4-polybutadiene with catalyst systems based on nickel compounds the presence of any moisture is highly undesirable. Thus, suspension polymerization in a water medium is not an effective process for the synthesis of very high cis-1,4-polybutadiene utilizing nickel catalyst systems.

An emulsion polymerization process is considered to be a three-phase reaction system consisting of large droplets of the monomer, the aqueous phase containing the dissolved initiator, and the colloidal particles of monomer-swollen polymer. While the emulsion polymerization process has the economic advantage of using water as the emulsion base, not all polymerization processes can tolerate the presence of water.

Such is the case with the polymerization of butadiene into very high cis-1,4-polybutadiene utilizing nickel catalyst systems.

In solution polymerization, an organic solvent is used which is capable of dissolving the monomer, the polymer and quite often the polymerization catalyst or initiator. Inasmuch as the polymer is soluble in the organic solvent which is used, there is a tendency for the viscosity of the solution to increase as the molecular weight of the polymer increases. If this continues over a period of time, the solution becomes too viscous to handle in conventional polymerization reaction systems unless the solids content is limited to a low level. In commercial polymerization processes, it is desirable to obtain a polymerization mass which has a high concentration of solid polymer and at the same time which is easy to handle and does not accumulate on the walls of the reaction vessel.

A process for the nonaqueous dispersion polymerization of butadiene monomer into a very high cis-1,4-polybutadiene would be very desirable. Such a nonaqueous dispersion polymerization process generally offers several distinct advantages over other possible polymerization techniques, including improved heat transfer, higher polymer concentrations in the reaction medium, increased production capacity, and energy saving.

A process for the nonaqueous dispersion polymerization of butadiene monomer in a liquid nonaqueous dispersion medium, for instance, n-butane or n-pentane with a Ziegler-Natta catalyst which utilizes a block copolymer dispersion stabilizer is described in U.S. Pat. No. 4,098,980 assigned to The Goodyear Tire & Rubber Company. This patent is hereby incorporated by reference in its entirety. The block copolymer dispersion stabilizer utilized in U.S. Pat. No. 4,098,980 contains at least two blocks of polymers linked by chemical valences, at least one block (A block) is soluble in liquid organic dispersion medium and at least another block (B block) is insoluble in the dispersion medium and the stabilizer acts to disperse the polybutadiene which is formed in the stabilizer's presence.

SUMMARY OF THE INVENTION

In accordance with the present invention, a process is provided for the nonaqueous dispersion polymerization of butadiene monomer in a liquid nonaqueous dispersion medium utilizing a homopolymer as the dispersion stabilizer (dispersing agent). The polymer that is utilized in this invention as the dispersing agent is a carbonylated polymer. The preferred carbonylated polymers for use in this invention are carbonylated EPDM's.

The butadiene monomer is polymerized to high molecular weight very high cis-1,4-polybutadiene (95% or more cis-1,4-content) in the presence of a carbonylated polymer as a dispersing agent in a nonaqueous dispersion medium in which the very high cis-1,4-polybutadiene is essentially insoluble. The liquid nonaqueous dispersion medium in which these dispersions are prepared must be a very poor solvent for the high molecular weight high cis-1,4-polybutadiene that is dispersed therein.

Some representative examples from which this medium can be selected include n-butane, isobutane, n-pentane, isopentane, neopentane, and isobutylene, and mixtures or combinations of any or all of these hydrocarbons. Standard nickel catalyst systems for the synthesis of very high cis-1,4-polybutadiene can be used in this polymerization technique.

This invention discloses a process for the nonaqueous dispersion polymerization of butadiene monomer in a reaction mixture containing a liquid nonaqueous dispersion medium, the improvement which comprises carrying out the polymerization of the butadiene monomer in the presence of at least one carbonylated polymer. This process for polymerizing butadiene results in improved heat transfer and lower overall energy requirements.

DETAILED DESCRIPTION

Butadiene can be polymerized to a high molecular weight very high (95% or greater) cis-1,4-polybutadiene in a nonaqueous liquid dispersion medium containing at least one carbonylated polymer. The nonaqueous medium in which this polymerization is run must be a very poor solvent for very high cis-1,4-polybutadiene. Some representative examples of nonaqueous media that can be employed in which the very high cis-1,4-polybutadiene is essentially insoluble include: n-butane, isobutane, n-pentane, isopentane, neopentane, 2-methylpentane, 2,2-dimethylbutane, 2,2-dimethylpentane, 2,4-dimethylpentane, 2,2,4-trimethylpentane, 2,2,3-trimethylbutane, isobutylene, 1-butene, 3-methyl-1-butene, trans-2-butene and any mixture of any or all of these nonaqueous media. Minor amounts of other hydrocarbons, which by themselves are solvents for very high cis-1,4-polybutadiene, can also be present in such a nonaqueous dispersion media; however, their presence in larger amounts is detrimental since such amounts of solvent will cause swelling of the cis-1,4-polybutadiene and result in an increase in viscosity. The presence of large amounts of solvents for cis-1,4-polybutadiene will lead to the formation of a cement-like composition. Since it is desirable for these nonaqueous dispersions to have a very low viscosity it is advantageous to minimize the amount of solvents for cis-1,4-polybutadiene in the nonaqueous medium.

The liquid nonaqueous dispersion media should contain less than about 5% aromatic and cyclocaliphatic hydrocarbons (which are good solvents for cis-1,4-polybutadiene) such as, benzene, toluene, ethylbenzene, cyclohexane, methylcyclohexane and the like. The nonaqueous medium must contain less than about 20% aliphatic hydrocarbons that are fair solvents for high cis-1,4-polybutadiene in order to be effective as a nonaqueous medium in the polymerization of high cis-1,4-polybutadiene. Some representative examples of such aliphatic hydrocarbons include: hexane, 3-methylpentane, 2,3-dimethylbutane, heptane, octane, 2,3-dimethylpentane, and 2,3,4-trimethylpentane.

Most olefins react too rapidly with the alkylaluminum catalysts that can be used in these polymerizations and/or are too good as solvents for the very high cis-1,4-polybutadiene to be useful as nonaqueous dispersion media. Some olefins that are exceptions to this general rule include trans-2-butene, isobutylene, 1-butene and 3-methyl-1-butene which can be used with good success as nonaqueous dispersion media. Fluorohydrocarbons can also be used very successfully as the nonaqueous dispersion media for the synthesis of very high cis-1,4-polybutadiene. Some representative examples of fluorohydrocarbons that can be employed as the nonaqueous dispersion media include 1,1,1,2,2-pentafluoropropane, decafluorobutane, octafluorobutane and the like.

Several factors are important in selecting the preferred medium for the nonaqueous dispersion polymerization of very high cis-1,4-polybutadiene. If the medium has a very low boiling point, it is necessary to operate the system at a relatively high pressure and/or low temperature. If the medium has a relatively high boiling point, more energy is required to recover and/or remove the last traces of the medium from the polymer. Other things being equal, the dispersed particles will stay dispersed or suspended slightly better in a high density medium than it will in a medium having a relatively low density. One of the most important factors in selection of a preferred nonaqueous medium is the relative solvency of the medium for the very high cis-1,4-polybutadiene and for the dispersing agent.

The relative solvency factor is related to the solubility parameter, which is the square root of the cohesive energy density, that is, $$\text{Solubility Parameter} = \sqrt{\frac{\Delta E}{V}}$$

where E is internal energy and V is the molar volume. A good medium for polymerizing butadiene to very high cis-1,4-polybutadiene should have a solubility parameter between about 6 and about 7 $(cal/cc)^{\frac{1}{2}}$; the solubility parameter values are those as reported by Kenneth L. Hoy in "New Values of the Solubility Parameters From Vapor Pressure Data." *Journal of Paint Technology*, vol. 42, no. 541, pp. 76–118 (1970). This article is incorporated herein by reference in its entirety.

The preferred media are n-butane, n-pentane, isopentane, 2-methylpentane, 2,2-dimethylpentane, 2,2,4-trimethylpentane, and any mixtures of two or more of these media.

It is essential to employ at least one carbonylated polymer as a dispersing agent in this nonaqueous polymerization of butadiene into very high cis-1,4-polybutadiene. The carbonylated polymers which are useful as the dispersing agents in these nonaqueous polymerizations include copolymers and terpolymers of alpha-olefins and conjugated diolefins and/or nonconjugated diolefins; and hompolymers, copolymers and terpolymers of conjugated diolefins and/or nonconjugated diolefins. Some representative examples of carbonylated polymers that can be employed as dispersing agents in nonaqueous polymerizations include: carbonylated 1-butene/1-hexane/1,4-hexadiene terpolymers, carbonylated propylene/1-hexene/dicyclopentadiene terpolymers, carbonylated 1-butene/1-octene/1,4-hexadiene terpolymers, carbonylated 1-hexene/5-methyl-1,4-hexadiene copolymers, carbonylated 1-hexene/trans-1,4-hexadiene copolymers, carbonylated polybutadiene, carbonylated polyisoprene, carbonylated polypiperylene, carbonylated butadiene/isoprene copolymers, carbonylated butadiene/piperylene copolymers, carbonylated poly(5-methyl-1,4-hexadiene), and the like. These carbonylated polymers should contain about one carbonyl group for every 5 to 100 carbon atoms in the polymer.

Carbonylated EPDM's are the preferred carbonylated polymers for use as dispersing agents in this invention. These carbonylated EPDM's are oxidized high molecular weight amorphous terpolymers of ethylene, propylene, and a nonconjugated diene with the residual unsaturated portion of the diene in a pendant side chain. The number average molecular weight of the carbonylated EPDM should be at least about 5000. Carbonylated EPDM's with number average molecular weights of about 10,000 to 200,000 are preferred as polymeric dispersing agents.

The number of carbonyl groups in these carbonylated EPDM's should be between about one per every 8 carbon atoms in the backbone of the polymer chain and about one per every 80 carbon atoms in the backbone of the polymer chain. The carbonylated EPDM polymers preferably will contain from about 30 to about 75 weight percent ethylene, from about 25 to about 60 weight percent propylene, and from about 2 to about 25 weight percent of the nonconjugated diene termonomer which provides the residual unsaturation. The carbonylated EPDM more preferably will contain about 45 to about 65 weight percent ethylene, about 35 to about 50 weight percent propylene, and about 3 to about 12 weight percent of the nonconjugated diene termonomer. This will usually result in about one double bond for every 30 to 300 carbon atoms in the polymer depending on the amount and type of nonconjugated diene termonomer utilized. Some examples of the most widely used and satisfactory nonconjugated diene termonomers include 1,4-hexadiene, dicyclopentadiene, methylene norbornene, and ethylidene norbornene.

The carbonylated EPDM's that are useful as dispersing agents in this invention can be prepared by the controlled oxidation of commercially available EPDM's. This carbonylation procedure is known to those skilled in the art and is outlined in U.S. Pat. Nos. 3,864,268 and 4,011,380 which are herein incorporated by reference in their entirety.

The reaction mixture utilized in the nonaqueous dispersion polymerization of butadiene to produce a very high cis-1,4-polybutadiene is comprised of a liquid nonaqueous dispersion medium, at least one carbonylated polymer, butadiene monomer, and a catalyst system. Such a polymerization can be run over a temperature range from 0° up to 100° C. Most generally, it is preferred to utilize a reaction temperature from 35° C. to 70° C. The reaction time required in such a polymerization will vary with the reaction temperature utilized, catalyst system, and catalyst level. Generally, this reaction time will vary from about 20 minutes up to about 30 hours. Commonly, it will be preferred to utilize a reaction time from about 1 up to about 6 hours.

The amount of butadiene monomer that can be utilized in such a nonaqueous dispersion polymerization reaction mixture can be varied from about 3 to about 30 weight percent based upon the total reaction mixture. It is preferred to have a concentration of butadiene monomer ranging from 10 to 25 percent by weight based upon the total reaction mixture. The amount of the carbonylated polymer required as a dispersing agent in this nonaqueous polymerization can vary from about 0.2 to about 2.0 phm (parts per 100 parts of butadiene monomer). It is preferred to employ from about 0.3 to about 1.0 phm of the carbonylated polymer.

It is desirable to conduct this polymerization in an oxygen- and moisture-free environment. For example, it is desirable to sparge the reaction mixture with dry nitrogen and to run the polymerization under a dry nitrogen atmosphere. The pressure in the reaction system during the polymerization generally will be a function of the polymerization temperature, the butadiene monomer concentration, and the boiling point of nonaqueous dispersion medium. This polymerization pressure will usually be within the range between 100,000 Pa (Pascal) and 500,000 Pa.

The catalyst systems used in this nonaqueous dispersion polymerization to prepare very high cis-1,4-polybutadiene are ternary systems comprised of an organoaluminum compound, a soluble nickel containing compound, and a fluorine-containing compound. The organoaluminum compound used is usually a trialkylaluminum, a dialkylaluminum hydride, or a dialkylaluminum fluoride. The preferred organoaluminum compounds include triethylaluminum (TEAL), tri-n-propylaluminum, triisobutylaluminum (TIBAL), trihexylaluminum, diisobutylaluminum hydride (DIBA-H), and diethylaluminum fluoride. Some representative examples of organonickel compounds that can be utilized include nickel benzoate, nickel naphthenate, nickel 2-ethylexanoate, which is commonly referred to as nickel octanoate or nickel octoate (NiOct), nickel neodecanoate, nickel acetylacetonate, and nickel complex of salicylaldehyde. Some representative examples of fluorine containing compounds that can be utilized include boron trifluoride ($BF_3$), hydrogen fluoride, boron trifluoride-diethyl etherate complex, boron trifluoride-di-n-butyl etherate complex, boron trifluoride-phenolate complex, boron trifluoride benzaldehyde complex, boron trifluoride-ethyl benzoate complex, hydrogen fluoride-diethylether complex, and hydrogen fluoride di-n-butyl ether complex.

The catalysts and the procedure for preparing very high cis-1,4-polybutadiene while utilizing nickel catalyst systems are described in U.S. Pat. Nos. 3,170,907, 3,483,177, and 3,856,764. All of the foregoing references are hereby incorporated by reference in their entirety. The catalyst components can be charged "in situ," premixed in the absence of any monomer, "preformed" by premixing in the presence of a minor amount of butadiene monomer, or premixed in the presence of certain polymers such as polybutadiene.

This nonaqueous dispersion polymerization can be run by simply adding the catalyst components to a nonaqueous dispersion medium which contains butadiene monomer and the carbonylated polymer to form the reaction mixture. During the course of the polymerization it will generally be desirable to provide some form of agitation to the reaction mixture, such as stirring, shaking, or tumbling. A shortstopping agent may be employed to terminate the polymerization after the desired reaction time or at the desired percent conversion of monomer to polymer. Antioxidants can also be added to these nonaqueous dispersions of very high cis-1,4-polybutadiene.

The nonaqueous dispersions formed in this polymerization process have concentrations of very high cis-1,4-polybutadiene generally ranging between about 14 and 20 weight percent which are quite fluid and permit greatly improved heat transfer in comparison to that occurring with the very viscous, highly swollen polybutadiene cement of similar concentrations produced when using solution polymerization techniques. Due to the relative fluidity of these nonaqueous dispersions, the concentration of dispersed very high cis-1,4-polybutadiene in the medium can be increased by 25 to 60% over the maximum allowable concentrations in solution polymerization techniques. This is achieved while maintaining adequate fluidity and heat transfer. Therefore, the production capacity of a given polymerization reactor can be greatly increased. The viscosity of the nonaqueous dispersion will increase sharply as the concentration of very high cis-1,4-polybutadiene in the dispersion increases.

A further advantage of using this nonaqueous dispersion polymerization technique is that the polymerization medium can be recovered and used directly for further polymerizations without the usual steam stripping, distillation, and drying since the dispersed particles can be removed by centrifuging, sedimentation or filtration.

For example, a nonaqueous dispersion can be mixed with about 1 phr of di-tertiary-butyl-p-cresol and a trace of methanol (0.1 to 0.5% by weight) and then charged into a rotary drum vacuum filter where the bulk of the liquid nonaqueous dispersion medium can be removed and pumped to a premix makeup tank where fresh butadiene can be added for utilization in further polymerizations. The filter cake of very high cis-1,4-polybutadiene can then be removed mechanically and/or by using a reverse flow of an inert gas or nitrogen to help dislodge the polymer from the filter cloth. The drying of the filter cake can be completed by passing it through a tunnel dryer or an expeller and extruder dryer.

An alternative method of recovering the solid high cis-1,4-polybutadiene from the nonaqueous dispersion medium is by centrifuging. For example, an automatic batch centrifuge can be employed. Separation by sedimentation followed by removal (pumping off) of the supernatant liquid can also be used. However, this is generally a much slower and less effective process.

A portion of the liquid nonaqueous dispersion medium from either the filtration, centrifugation or sedimentation operations will generally have to be distilled in a fractionating column before it is returned to the premix makeup tank for use in additional polymerizations. This is in order to prevent buildup of excessive amounts of impurities in the recycled dispersion medium. Distillation of 15 to 25% by weight of the recycle medium normally will suffice although the amount will depend upon operating conditions.

Such a nonaqueous dispersion can also be processed in a manner similar to that customarily utilized in solution polymerization techniques, where the "cement" is mixed with water and steam which coagulate the polymer and vaporize the solvent and unreacted monomer. This is a very energy intensive process wherein water is removed from the "crumb" rubber in a dewatering tank and trough, a water expeller, and an extruder dryer. Several other variations in centrifuging, filtration and sedimentation operations are described by W. L. McCabe and J. C. Smith in *Unit Operations of Chemical Engineering*, Third Edition, McGraw-Hill Chemical Engineering Series, Chapter 30, pages 922–972 (1976). This article is incorporated herein by reference in its entirety.

DESCRIPTION OF THE PREFERRED EMBODIMENTS

This invention is illustrated by the following examples which are presented merely for the purpose of illustration and are not to be regarded as limiting the scope of the invention or manner in which it may be practiced. Unless specifically indicated otherwise, parts and percentages are given by weight. Inherent viscosities also referred to as dilute solution viscosities were determined at a concentration of 0.5 weight percent of cis-1,4-polybutadiene in toluene at 30° C. Inherent viscosity is defined as the natural logarithm of relative viscosity divided by the concentration of polymer in toluene solution and is expressed in units of deciliters per gram (dl/g).

Brookfield viscosities for the dispersions were determined at 25° C. using a Brookfield viscometer, Model LVF manufactured by Brookfield Laboratories, Inc. The very high cis-1,4-polybutadiene samples were separated from the nonaqueous mediums by air drying on drying trays followed by vacuum drying to constant weight.

EXAMPLES 1 through 5

A solution of butadiene in n-pentane was passed down a silica gel column, measured quantities were charged to a series of 4-ounce (118 ml) bottles, and then the solution was sparged with dry nitrogen.

From 80 to 100 ml of this solution was added to each of the bottles. This premix contained 9 g (grams) of butadiene monomer per 100 ml of solution. Aliquots of a 5 weight percent solution of a carbonylated EPDM (ethylene-propylene-diene terpolymer) in a solvent-extracted SAE 5W mineral oil were added as a dispersing agent (DA) to all except one of the bottles. The carbonylated EPDM was provided by The Amoco Chemical Division of the Standard Oil Company of Indiana. The catalyst components were charged into the bottles by "in situ" addition in the following order; (1) triethylaluminum (TEAL), (2) nickel octanoate (NiOct) and (3) boron trifluoride-dibutyl etherate complex ($BF_3$). The bottles were capped, placed in a constant temperature water bath at 50° C., and tumbled end-over-end. The amount of each of the catalyst components charged into the bottles in millimoles/100 g of butadiene (mhm), the amount of dispersing agent (DA) added, the polymerization time, the polymer yield, the dilute solution viscosity (DSV) of the polymer produced and the appearance of the nonaqueous dispersion (NAD) formed are given in Table I.

TABLE I

| Example | DA phm | Catalyst Added (mhm) | | | Polymerization Time (hours) | NAD Appearance | Polymer Yield, % | DSV (dl/g) |
| --- | --- | --- | --- | --- | --- | --- | --- | --- |
| | | TEAL | NiOct | $BF_3$ | | | | |
| 1 | 0 | 1 | 0.075 | 2 | 4 | Balls | 87 | 3.0 |
| 2 | 0.25 | 1.5 | 0.11 | 3 | 4 | Coating | 87 | — |
| 3 | 0.37 | 1.5 | 0.11 | 2.7 | 3 | NAD | 92 | 2.8 |
| 4 | 0.50 | 2 | 0.15 | 4 | 4 | NAD | 89 | 2.6 |
| 5 | 0.50 | 1 | 0.075 | 2 | 3 | NAD | 74 | 2.4 |

The polybutadiene was essentially insoluble in pentane. It agglomerated into balls and some coated the walls of the bottle in Example 1. When 0.25 part of the DA per 100 g of butadiene was present, most of the polymer coated the inside of the bottle. At 0.37 and 0.50 phm of the DA, the polymer particles were dispersed in the pentane. Some particles settled while standing, but they redispersed when the bottles were shaken. The Brookfield viscosities of the dispersions in pentane were only about 3 centipoises. Brookfield viscosities were determined using a Number 1 spindle at 60 rpm. An aliquot of the dispersion from Example 4 was placed between glass slides and examined under a light microscope. The dispersed particles were spheres having an average particle size of about 2.5 microns.

The polymer prepared in Example 4 was analyzed by infrared spectroscopy using the general method of Silas, Yates, and Thornton (Analytical Chemistry, Volume 31, page 529, 1959) which has been modified by employing $^{13}C$ nuclear magnetic resonance (NMR) analysis to calibrate the infrared analytical matrices. The polymer analyzed 95% (97 if normalized) cis-1,4-, 1% trans-1,4- and 2%, 1,2-polybutadiene.

EXAMPLES 6 THROUGH 10

A purified butadiene-in-n-pentane premix containing 90 g of butadiene monomer (BD) per liter of solution was charged to a series of 4-ounce (118 ml) bottles. Additional liquid BD was transferred from a separate bottle by means of a two-way stopcock and hypodermic syringe needles in increasing amounts to three of the bottles. The amount of BD added was determined by the increase in weight. Carbonylated EPDM (DA) and the cataylyst components were injected "in situ" through the bottle cap liner. Example 6 served as a control and so no dispersing agent (DA) was added; 0.37 phm of DA and 1.0, 0.06, and 1.9 millimoles per 100 grams of monomer (mhm) of TEAL, NiOct and $BF_3.Bu_2O$ respectively were added to each of the other bottles. The polymerization conditions were three hours at 50° C., except for Example 6 which was polymerized for 5 hours. The total amount of butadiene charged is listed in Column 2, Table II, the approximate weight percent of polybutadiene in the dispersion at the end of polymerization is listed in Column 5. The Brookfield viscosities and the appearance of the dispersions are presented in Columns 6 and 7. The amount of carbonylated EPDM charged into the bottles in Example 6 through 9 was 0.37 phm and the amount of carbonylated EPDM charged into the bottle in Example 10 was 0.5 phm. Brookfield viscosities were determined using Numbers 1, 2, and 4 spindles at 30 rpm for Examples 7, 8, and 9, respectively. Brookfield viscosities were not determined for Examples 6 and 10.

they were still relatively low (less than 1,000 cps) even at 25 weight percent concentration.

EXAMPLES 11 AND 12

The same procedure that was employed in Examples 6 and 10 was used here except that hexane was used in place of n-pentane as the liquid nonaqueous dispersion medium. The results of these experiments are summarized in Table III.

TABLE III

| Example | BD Added (g) | Yield (weight %) | DSV (dl/g) | Polybutadiene (weight %) | Brookfield Viscosity (cps) | Appearance (After standing for 24 hours) |
|---|---|---|---|---|---|---|
| 11 | 10.5 | 97 | 2.5 | 14.7 | 11,000 | Viscous Cement |
| 12 | 14.1 | 98 | 2.7 | 21 | 40,200 | Very Viscous Cement |

As can be determined from Table III, when the polybutadiene is prepared in a media in which it is soluble, for example, hexane, very viscous cements having Brookfield viscosities of several thousand centipoises are produced.

EXAMPLES 13 THROUGH 15

A purified butadiene-in-n-pentane solution containing 90 grams of butadiene per liter was charged to a series of three 4-ounce (118 ml) bottles. Aliquots of a solution of a carbonylated EPDM (DA) as described in Examples 1 through 5 were added to two of the bottles. A "preformed" catalyst was prepared by injecting the following components into a dry, nitrogen-flushed bottle;

| | ml | millimoles |
|---|---|---|
| Hexane | 14.9 | |
| 1.67M BD in pentane | 6.0 | 10 |
| 0.5M TEAL in pentane | 4.0 | 2 |
| 0.1M NiOct in hexane | 1.5 | 0.15 |
| 1.0M $BF_3.Bu_2O$ in pentane | 3.6 | 3.6 |

Then 1.5 ml of the preformed catalyst was injected into each of the bottles of BD in pentane premix, and the bottles were placed for three hours in a polymerization bath controlled at 50° C. This was equivalent to a catalyst charge of $BD/TEAL/NiOct/BF_3.Bu_2O = 5.5/1.1/0.083/2.0$ millimole per 100 g of BD in the premix. The results are summarized in Table IV.

TABLE IV

| Example | DA, phm | Yield, wt % | DSV, dl/g | Appearance after 24 hours |
|---|---|---|---|---|
| 13 | 0 | 95 | 3.47 | Plated on a glass |
| 14 | 0.37 | 99 | ND | NAD originally, but settled |
| 15 | 0.50 | 97 | 3.40 | NAD; settled but redispersed when stirred |

TABLE II

| Example | BD Added (g) | Yield (weight %) | DSV (dl/g) | Polybutadiene (weight %) | Brookfield Viscosity (cps) | Appearance (After standing for 24 hours) |
|---|---|---|---|---|---|---|
| 6 | 9 | 93 | 3.8 | 13 | — | Plated Out |
| 7 | 9 | 94 | 3.5 | 13 | 3 | Excellent NAD |
| 8 | 15 | 98 | 3.2 | 22.5 | 115 | Good NAD |
| 9 | 15.9 | 100 | 3.3 | 25.5 | 860 | Viscous NAD |
| 10 | 17.2 | 100 | 3.3 | 27 | — | Slug of NAD |

The Brookfield viscosities of the dispersions increased as the polymer concentration increased, but ND denotes not done.

EXAMPLES 16 THROUGH 21

A purified butadiene-in-n-pentane premix was prepared and charged to a series of 4-ounce (118 ml) bottles as described in Examples 1 through 5.

In order to demonstrate the relative specificity of the carbonylated EPDM as a good dispersing agent (DA) for the high cis-1,4-polybutadiene in a nonaqueous medium, an ethylene-propylene copolymer (EPM) and a carbonylated EPM in SAE 5W mineral oil were evaluated as dispersing agents. Ten phm of a naphthenic oil also was tried.

The catalyst components (TEAL:NiOct:BF$_3$.Bu$_2$O=1.0:0.05:2.0 millimole/100 g BD) were charged "in situ" after the proposed dispersing agents were added. The bottles were placed in a water bath at 50° C. for four hours. The results are summarized in Table V.

TABLE V

| Example | DA, phm | NAD Appearance | Yield (weight %) |
|---|---|---|---|
| 16 | None | Plated Out | 78 |
| 17 | Naphthenic Oil ,10 | " | 65 |
| 18 | EPM ,0.35 | " | 99 |
| 19 | EPM ,0.70 | " | 93 |
| 20 | CO-EPM ,0.50 | " | 93 |
| 21 | CO-EPDM ,0.40 | Excellent NAD | 95 |

CO-EPM - carbonylated ethylene-propylene copolymer
CO-EPDM - carbonylated ethylene-propylene-diene terpolymer The DSV in Example 16 was determined to be 3.3 dl/g and it was determined to be 3.0 dl/g in Example 21.

EXAMPLE 22

A purified 18.4 weight percent butadiene-in-n-pentane solution was charged to a 25-gallon reactor equipped with a stirrer and cooling jacket. The dispersing agent, 0.4 phm of carbonylated EPDM in 7.6 phm of SAE 5W oil, was added and then the catalyst components were charged "in situ." The weight ratio of TEAL:NiOct:BF$_3$.Bu$_2$O charged was 6.61:1.0:6.7. The total amount of the catalyst added was 0.022 phm. The polymerization temperature was 51° C. and the time was five hours. A good dispersion was formed. After drying, the polymer had a Mooney viscosity (ML-4 at 100° C.) of 54 and its DSV was 3.3 dl/g. The yield of polybutadiene was 78 weight percent.

EXAMPLES 23 THROUGH 27

A purified butadiene-in-n-pentane premix was prepared and charged to series of 4-ounce (118 ml) bottles as described in Examples 1 through 5; additional butadiene was added to the last bottle through a two-way stopcock and syringe needles. A carbonylated EPDM was added as a dispersing agent (DA) to all except the first bottle (Example 23), and the catalyst components were charged by the "in situ" method. Hydrogen fluoride dibutyl ether complex (HF) was added in these Examples instead of BF$_3$.Bu$_2$O. The contents of all bottles were polymerized at 50° C. for 19 hours in a water bath. The other polymerization conditions and the results are summarized in Table VI. All bottles that contained carbonylated EPDM started out as very fluid dispersions. However, approximately one-half of the polymers produced in Examples 24 and 26 settled out of suspension after several hours. All polymers were solid elastomers after drying.

TABLE VI

| Example | BD, g Total | DA, phm | Millimole/100g BD TEAL | NiOct | HF | Appearance | Yield wt % |
|---|---|---|---|---|---|---|---|
| 23 | 9 | 0 | 1 | .075 | 2.0 | Plated out | 89 |
| 24 | 9 | 0.4 | 1 | .075 | 1.8 | Fair NAD | 62 |
| 25 | 9 | 0.5 | 1 | .075 | 1.8 | NAD | 59 |
| 26 | 9 | 0.5 | 2 | .075 | 5.5 | Poor, NAD | 66 |
| 27 | 14.8 | 0.5 | 1 | .50 | 3.2 | NAD | 42 |

The DSV in Example 23 was determined to be 5.4 dl/g and it was determined to be 5.3 dl/g in Example 24.

While certain representative embodiments and details have been shown for the purpose of illustrating the invention, it will be apparent to those skilled in this art that various changes and modifications may be made therein without departing from the scope of the invention.

What is claimed is:

1. A process for the nonaqueous dispersion polymerization of butadiene monomer in a reaction mixture containing a liquid nonaqueous dispersion medium, the improvement which comprises carrying out the polymerization of the butadiene monomer in the presence of at least one carbonylated polymer selected from the group consisting of (1) carbonylated copolymers of alpha-olefins and conjugated diolefins, (2) carbonylated terpolymers of alpha-olefins and conjugated diolefins, (3) carbonylated copolymers of alpha-olefins and nonconjugated diolefins, (4) carbonylated terpolymers of alpha-olefins and nonconjugated diolefins, (5) terpolymers of alpha-olefins, conjugated diolefins, and nonconjugated diolefins, (6) carbonylated homopolymers of conjugated diolefins, (7) carbonylated homopolymers of nonconjugated diolefins, (8) carbonylated copolymers of conjugated diolefins and nonconjugated diolefins, and (9) carbonylated terpolymers of conjugated diolefins and nonconjugated diolefins.

2. A process as specified in claim 1, wherein said carbonylated polymer is a carbonylated EPDM.

3. A process as specified in claim 2, wherein the number average molecular weight of said carbonylated EPDM is at least 5000.

4. A process as specified in claim 1, wherein the solubility parameter of said liquid nonaqueous dispersion medium is between about 6 and about 7 (cal/cc)$^{\frac{1}{2}}$.

5. A process as specified in claim 1, wherein the amount of said butadiene monomer in said reaction mixture is from about 3 to about 30 weight percent based upon the total reaction mixture.

6. A process as specified in claim 5, wherein the amount of said butadiene monomer in said reaction mixture is from 10 to 25 weight percent based upon the total reaction mixture.

7. A process as specified in claim 1, wherein the amount of said carbonylated polymer present in said reaction mixture is from about 0.2 phm to about 1.0 phm.

8. A process as specified in claim 7, wherein the amount of said carbonylated polymer present in said reaction mixture is from about 0.3 phm to about 0.5 phm.

9. A process as specified in claim 1, wherein said polymerization is run at a temperature from 0° C. to 100° C.

10. A process as specified in claim 3, wherein the number average molecular weight of said carbonylated EPDM is about 10,000 to 200,000.

* * * * *